United States Patent [19]

Konz

[11] 4,407,232

[45] Oct. 4, 1983

[54] APPARATUS FOR IMMOBILIZING ANIMALS OF RANDOMLY ENCOUNTERED SIZES

[76] Inventor: Gerald J. Konz, R.R. #1 (Box 72), Minden, Iowa 51553

[21] Appl. No.: 356,123

[22] Filed: Mar. 8, 1982

[51] Int. Cl.³ .......................... A01K 19/00; A61D 3/00
[52] U.S. Cl. .................................................. 119/103
[58] Field of Search ..................... 119/96, 98, 99, 103; 17/1 A

[56] References Cited

U.S. PATENT DOCUMENTS

| | | | |
|---|---|---|---|
| 1,705,115 | 3/1929 | Hollestelle | 119/103 |
| 2,705,475 | 4/1955 | Johnisee | 119/103 |
| 2,781,740 | 2/1957 | Duffy | 119/103 |
| 2,960,966 | 11/1960 | Monson | 119/103 |
| 3,137,273 | 6/1964 | Greenwood | 119/103 |
| 3,164,131 | 1/1965 | Bradshaw | 119/103 |
| 3,548,787 | 12/1970 | Watson | 119/103 |
| 3,717,128 | 2/1973 | Pearman et al. | 119/103 |
| 3,732,847 | 5/1973 | Anderson | 119/103 |
| 4,214,556 | 7/1980 | Knox et al. | 119/103 |

Primary Examiner—Robert Peshock
Assistant Examiner—Kris R. Schulze
Attorney, Agent, or Firm—George R. Nimmer

[57] ABSTRACT

Animal immobilization apparatus accommodates a typically encountered range of herd animal sizes to permit an unassisted operator to perform various animal treatments such as castration, innoculations, surgery, tatooing, and the like. The apparatus is especially useful to an unassisted operator whose task is to quickly humanely castrate the various sizes of pigs in his herd. Each successively encountered herd animal is placed supinely within the apparatus cradle that is frontally equipped with a canopy restricting the animal's head. A laterally extending restraining-bar is moved forwardly and downwardly along apparatus parallel inclined-rails so as to press forwardly against the thus immobilized animal's upstanding hindlegs. For further operational convenience, the apparatus will have the cradle member pivotably mounted at some finite-elevation, and will be equipped with means for resisting the hindlegs reflexes against the restraining-bar.

12 Claims, 3 Drawing Figures

APPARATUS FOR IMMOBILIZING ANIMALS OF RANDOMLY ENCOUNTERED SIZES

Owners of livestock herds need to quickly and humanely immobilize successive herd members for such husbandry treatments as castration, innoculations, surgery, tatooing, etc. Because the individual herd members being brought successively to the immobilization station vary in body size, the prior art has recognized the need for immobilization apparatus that will accommodate the various sizes of animals randomly encountered at the immobilization station. Representative of such prior art is U.S. Pat. No. 4,214,556(Knox,et al-July 29, 1980) and the prior art references alluded to therein, wherein the apparatus generally comprises a cradle and a restraining member movably associated with the cradle for temporarily immobilizing the cradled animal. However, animal immobilization apparatus of the prior art tend to suffer from one or more of the following disadvantages and deficiencies at the restraining member portion. Engagement of the restraining member with respect to the cradled animal normally requires two operators, one manually grappling with the animal while the second operator is manipulating the restraining member. Accommodation for the randomly encountered animal size requires time-consuming and laborious prepatory adjustment of the restraining and/or cradle members. Actual maintenance of animal immobilization during castration or other animal treatment, even while the restraining means is engaged, might require the assistance of a second operator. Upon completion of the castration or other treatment task, quick and humane removal of the animal is difficult for an unassisted operator.

It is accordingly the general objective of the present invention to provide improved apparatus for immobilizing randomly encountered animal sizes that overcomes the disadvantages and deficiencies of prior art apparatus. Ancillary general objectives include providing apparatus for immobilizing individual herd animals of varying sizes wherein a lone operator might quickly, efficiently, and humanely perform the following operations on each randomly encountered animal; placing the animal into the cradle member portion, engaging ythe restraining member onto the cradled animal without prior adjustment of the apparatus, performing the castration or other treatment task upon the restrainably immobilized animal, humanely and quickly removing the treated animal from the apparatus, and then repeating the same operations for the next randomly encountered herd animal without having to adjust the apparatus parts. An important specific objective is to provide apparatus especially adaptable to the treatment task of castrating the operator's entire herd of various sizes pigs in rapid succession.

With the above and other objects and advantages in view, which will become more apparent as this description proceeds, the apparatus for immobilizing randomly encountered animal sizes generally comprises: a generally horizontal cradle member; a forwardly and downwardly convergent canopy member overlying the crade member forward portion for restraining the animal's head; forwardly and downwardly extending inclined-rail means, preferably comprising two parallel lineal-rails having a predetermined slope to accommodate a range of animal sizes, and having its major length disposed above and rearwardly of the canopy member; coupling means non-rotatably and reciprocatably slidably associated along the inclined-rail means; a restrainer-bar extending rigidly laterally and horizontally from the coupling means and being adapted to press firmly against the upstanding hindlegs of the supinely cradled animal as the coupling means moves forwardly and downwardly along the inclined-rail means; handle means to permit the operator to manually reciprocate the restrainer-bar; reflex resistance means to resist rearward reflexes asserted by the supine animal's upstanding hindlegs against the restrainer-bar; and together with other permissible optional features to enhance the ease of an unassisted person in performing the intended treatment for each randomly encountered herd animal.

In the drawing, wherein like characters refer to like parts in the several views, and in which.

Figure 2:
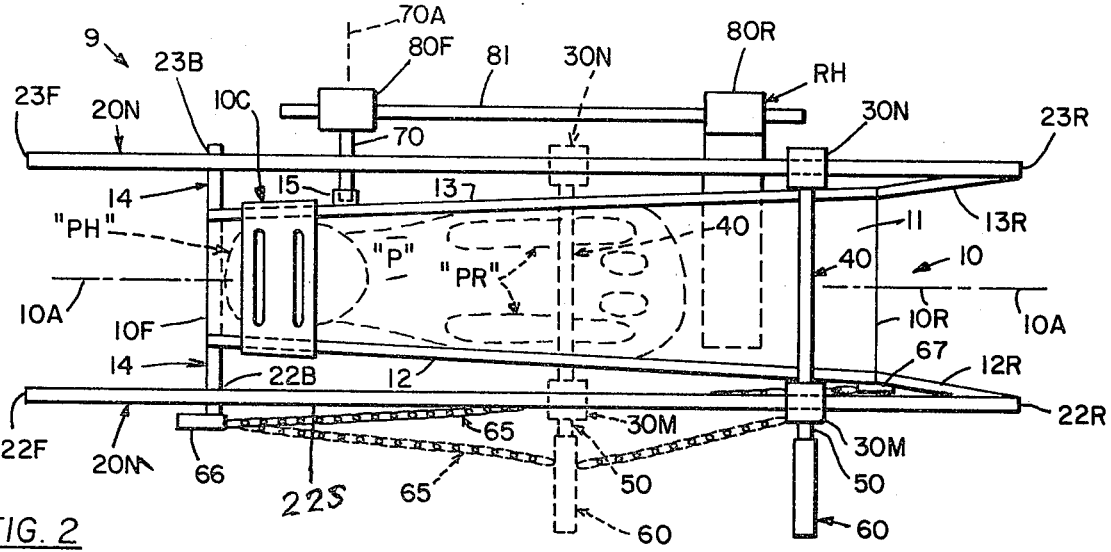
FIG. 2 is a top plan view of the representative embodiment, an immobilized pig animal "P" being indicated in phantom line.
Figure 1:
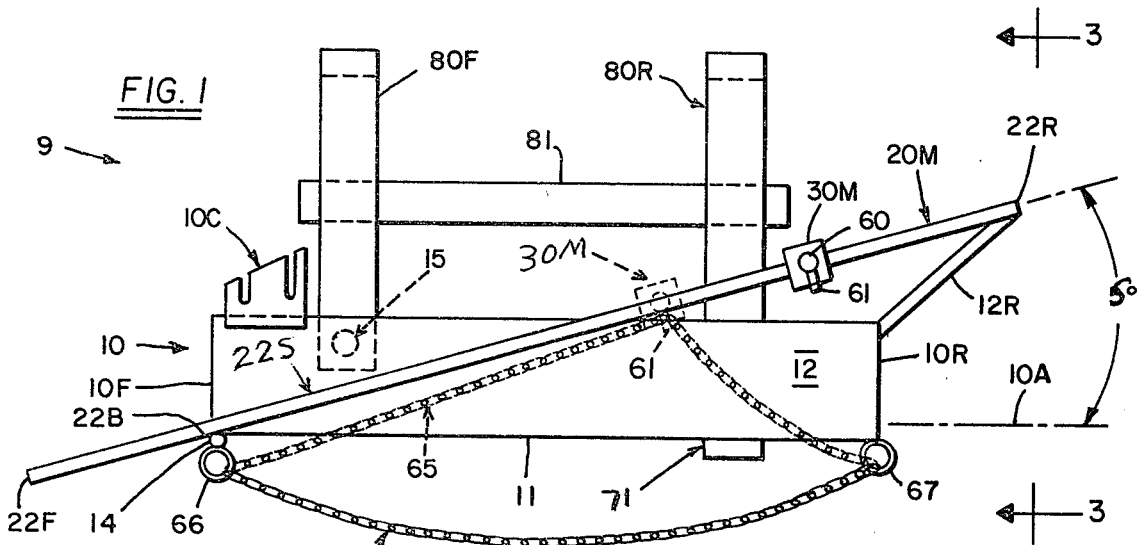
FIG. 1 is a side elevational view of a representative embodiment of the animal immobilization apparatus of the present invention.
Figure 3:
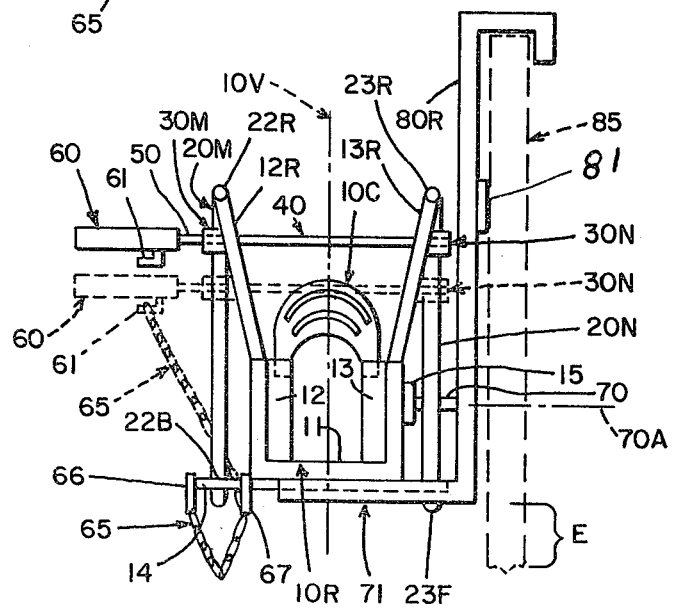
FIG. 3 is a rearward elevational view of the representative embodiment.

Representative embodiment 9 of FIGS. 1-3 generally comprises: a generally horizontal cradle member 10 extending longitudinally (10A) between aft-end 10R and fore-end 10F; a forwardly and downwardly convergent canopy member 10C overlying the cradle means frontal portion and for restraining the supine animal's head e.g. "PH"; forwardly and downwardly extending inclined-rail means, such as parallel lineal-rails 20M and 20N, each having a predetermined slope of S° relative to central-axis 10A whereby to accommodate a range of animal sizes; coupling means along the inclined-rail means, such as collars 30M and 30N respectively slidably engaged along the lineal-rails 20M and 20N; a restrainer-bar 40 extending rigidly laterally from the coupling means and being adapted to press firmly against the supine animal's upstanding hindlegs "PR" as the coupling means (through handle means e.g. 50) is moved forwardly and downwardly along the inclined-rail means 20; reflex resistance means e.g. 60, 65, to resist rearward reflexes asserted by the supine animal's upstanding hindlegs "PR" against the restrainer-bar 40; laterally extending (70A) pivot means for pivotably mounting the cradle forward portion and wherein there might' be a support 71 underlying the cradle means, said underlying support being desireably mounted at convenient operational elevation "E", as through hook means 80.

Cradle member 10 includes a floor 11 extending longitudinally along a substantially horizontal central-axis 10A and located between cradle upright sides 12 and 13 whereby the cradle can support the vertebrae of a supine animal (e.g. "P") along axis 10A. The cradle member fore-end 10F is located nearer to the animal's head (e.g. "PH") and shoulders, and the aft-end 10R is located nearer to supine animal's rump and upstanding hindlegs (e.g. "PR"). The cradle member longitudinally extending floor and upright sides might take the form of three interconnected rectangular panels as shown, or might take a skeletal form (not shown) comprising interconnected bars. If desired, for the purpose of further facilitating the accommodation of an unusual range of animal sizes, the laterally separated upright sides 12 and 13 (which flank axis 10A) might converge toward cradle fore-end 10F. A forwardly and downwardly convergent canopy member 10C is attached to the cradle member, as to the sides 12,13, and overlies the cradle forward portion, whereby such tapered canopy member will overlie the head (e.g. "PH") but not the upstanding frontlegs of the supine animal and restrict the animal's head from forward and lateral movements. Herein, the tapered canopy member 10C is arbitrarily depicted in skeletal form.

There are forwardly and downwardly extending inclined-rail means attached to and laterally offset from the cradle member, said means (e.g. 20M and 20N) lying substantially parallel to the imaginary vertical-plane (10V) passing through central-axis 10A. The inclined-rail means has a finite rearward-length (e.g. from 22S to 22R) extending rearwardly of the canopy member 10C and wherein a major proportion of said finite rearward-length is disposed at higher elevation than the cradle upright sides. The inclined-rail means has, with respect to the horizontal plane of axis 10A, an angular slope of S° within the range of substantially 10° to 20°. Preferably, the inclined-rail means takes the form of a pair of parallel lineal-rails 20M and 20N respectively laterally offset from the upright sides 12 and 13 of the cradle member. Herein, rail 20M has a lower lead-end 22F and has a higher trail-end 22R, and identical rail 20N has a lead-end 23F co-elevational with 22F and has a trail-end 23R co-elevational with 22R. Identical frontal portions (e.g. 22B and 23B) of rails 20M and 20N are attached to a laterally extending lug 14 carried by the forward underside of cradle member floor 11. And identical rearward portions (e.g. 22R and 23R) are attached at coelevation above the cradle aft-end 10R, such as by struts 12R and 13R extending upwardly from cradle sides 12 and 13. Each of said identical rails 20M and 20N should have the identical slope S° within the aforestated 10° to 20° range, whereby to accommodate a range of randomly encountered animal sizes. For certain specialized tasks, such as castrating a herd of pigs within sizes of ten to sixty pounds, the slope might be narrower e.g. range of 12° to 18°, or preferably 14° to 17°. Once the angle S° is selected by the apparatus manufacturer or re-selected by the owner, a procession of various animal sizes can be randomly introduced to the apparatus 9 in rapid succession, the same selected angular slope S° sufficing for the entire herd.

There are coupling means non-rotatably and reciprocatably slidably associated along the finite rearward-length (e.g. 22S–22R) of the inclined-rail means. As previously alluded to, a purpose of the coupling means is to carry the restrainer-bar (e.g. 40) along the S° slope to ultimately press forwardly against the supine animal's upstanding hindlegs "PR". For the lineal-rails type inclined-rail means, the coupling means desireably takes the form of collars 30M and 30N slidably surrounding the respective lineal-rails 20M and 20N. The restrainer-bar 40 extends rigidly laterally and substantially horizontally from the coupling means so as to overlie the cradle member; when there are two collars as the coupling means, the laterally extending restrainer-bar 40 connected the slidable collars (e.g. 30M and 30N) in non-rotatable relationship to the inclined-rail means. There are manipulation means to permit the operator to reciprocate the coupling means and the restrainer-bar along the finite rearward-length (e.g. 22S–22R) of the inclined-rail means, which manipulation means might take the fudimentary form of a stub-shaft 50 extending rigidly laterally and horizontally from collar 30M.

There are reflex resistance means to resist rearward reflexes asserted by the supine animal's upstanding hindlegs against the forwardly moved restrainer-bar 40. In drawing FIG. 2, solid line indicates the restrainer-bar and the coupling means rearwardly withdrawn prepatory to engagement with the supine animal; and in FIG. 2, phantom lines indicate the restrainer-bar and coupling means moved forwardly against the upstanding hindlegs of the thus immobilized animal and with the reflex resistance means resisting the animal. The reflex resistance means might take several forms, two independently adequate such forms being shown in the drawing. Attached to stub-shaft 50 there might be a laterally lengthy handle 60 whereby the operator might lean bodily forwardly against such handle 60 to resist the hindlegs reflexes against restrainer-bar 40. The alternate form shown is of the releasable locking type such as comprising a lengthy non-stretchable multi-links chain 65 having its fore part attached to a forward part of the apparatus e.g. joined by ring 66 attached at lug 14, and for the taut chain a link catch rigidly associated with the restrainer-bar. Herein depicted, the catch takes the form of a clip 61 carried by the underside of handle 60, though the clip 61 might be similarly attached elsewhere e.g. to stub-shaft 50, to collar 30M, etc. The multi-links chain rear part might be attached to rearward portion of the apparatus e.g. joined by ring 67 attached at cradle aft-end 10R.

Desireably, there are laterally extending pivot means for pivotably mounting the cradle member rearward portion enabling the operator to lift the cradle member rearward portion whereby the erstwhile immobilized and treated animal can be quickly and humanely ejected from the canopied forward portion and the animal lands on its feet to join the previously treated herb animals. Such pivot means might take the form of a bushing 15 extending laterally along pivot-axis 70A from a frontal portion of cradle upright side 13; bushing 15 journals a pivot-shaft 70 which extends along axis 70A and which is attached to mounting means framework e.g. to 80F.

Mounting means framework serves either or both of the following purposes, namely to support the pivot means, and/or to maintain the cradle member at convenient working elevation (e.g. "E") for the operator. In the latter vein, the mounting means framework might take the form of two uprightly extending hook members 80F and 80R having their spacing set by longitudinal strap 81 whereby the hook means 80F and 80R might suspend the cradle member from a vertical fence (85), a truck side panel or end gate, etc. In the drawing, rightward hook member 80R carries a laterally extending shelflike support 71 which supportably underlies though is detached from the cradle rearward portion, and it permits the maintenance of elevation "E" and the lifting of the cradle member so as to pivot about axis 70A.

Though having already been alluded to, operation of the representative embodiment 9 by a lone operator is summarized as follows. Preferably, the incoming-pen of animals to be rapidly successivley immobilized and treated is located to the rear of the apparatus; the receiver-pen for treated animals is located forwardly of the apparatus. First, the operator randomly chooses an animal from the incoming-pen and places it supinely within the cradle member while pushing the animal so its head is beneath the canopy member. Then, the operator moves the restrainer-bar forwardly and downwardly along the inclined-rail means having slope S° until the restrainer-bar presses firmly against the supine animal's upstanding hindlegs. The latter step immobilizes the animal, which immobilization is maintained by the reflex resistance means e.g. 60, 65. Next, the operator performs the castration or other task upon the immobilized animal. Upon completion of this task, the reflex resistance means is released and the restrainer-bar is rearwardly withdrawn from the hindlegs, whereupon the treated animal can be removed from the cradle member e.g. by pivoting the cradle about axis 70A. The aforesaid steps are repeated for each of the succeeding animals randomly chosen from the incoming-pen until the entire herd is individually immobilized and treated, all being accomplished without adjustment of the originally established angle S°.

From the foregoing, the construction and operation of the animal immobilization apparatus will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed is as follows:

1. Apparatus for immobilizing animals of randomly encountered sizes to permit the performance of castration or other tasks, said apparatus comprising:
   A. a cradle member extending longitudinally along a substantially horizontal central-axis located along floor means and disposed between laterally separated upright sides thereof whereby the cradle member will support the vertebrae of a randomly encountered animal placed supinely along said central-axis, said cradle member having, for accommodating the supinely placed animal's head and shoulders, a forward portion terminating at a fore-end and also having, for accommodating the animal's rump, a rearward portion terminating at an aft-end;
   B. a forwardly and downwardly convergent canopy member attached to the cradle member and overlying only the forward portion thereof, whereby said canopy member will overlie the head, but not the frontlegs, of the supine animal and restrict the animal's head from forward and lateral movements;
   C. forwardly and downwardly extending inclined-rail means attached to and laterally offset from the cradle member, said inclined-rail means lying substantially parallel to an imaginary vertical-plane passing through the cradle member central-axis, said inclined-rail means having a finite rearward-length extending rearwardly of the canopy member and wherein a major proportion of said rearward-length is disposed at higher elevation than the cradle member upright sides;
   D. coupling means non-rotatably and reciprocatably slidably associated along the rearward-length of the inclined-rail means;
   E. a restrainer-bar extending rigidly laterally and horizontally from the coupling means so as to overlie the cradle member and the supine animal, said restrainer-bar being adapted to press firmly against the supine animal's upstanding hindlegs as the operator manipulated the coupling means forwardly an downwardly along said inclined-rail means rearward-length; and
   F. reflex resistance means to resist rearward reflexes asserted by the supine animal's upstanding hindlegs against the forwardly moved restrainer-bar.

2. The apparatus of claim 1 wherein the inclined-rail means has, with respect to the horizontal plane of the central-axis, a slope hving a constant angular value selected within the range of substantially 10° to 20° whereby a single embodiment of the apparatus will accommodate a range of animal sizes.

3. The apparatus of claim 2 wherein the inclined-rail means comprises a pair of substantially parallel lineal-rails respectively laterally offset from opposite upright sides of the cradle means; wherein the coupling means comprises collars respectively slidably associated along the lineal-rails; and wherein the two collars are connected together with said laterally extending restrainer-bar.

4. The apparatus of claim 3 wherein the cradle member laterally separated and longitudinally extending upright sides forwardly converge toward the canopied forward portion; and wherein the slope of each of the parallel lineal-rails is substantially identical and of a constant angular value selected within the range of 12° to 18°.

5. The apparatus of claim 1 wherein there are laterally extending pivot means for pivotably mounting the cradle member forward portion and wherein there is a fixed-elevational support underlying and detached from the cradle member rearward portion whereby the supinely immobilized animal might be humanely ejected from the canopied forward portion whenever the operator rearwardly moves the restrainer-bar and lifts the cradle member rearward portion.

6. The apparatus of claim 1 wherein the reflex resistance means comprises a laterally lengthy handle actuatably connected to the coupling means and which the operator might lean forwardly thereagainst.

7. The apparatus of claim 1 wherein the reflex resistance means comprises releasable locking means to maintain the forwardly moved restrainer-bar tightly against the supine animal's hindlegs.

8. The apparatus of claim 7 wherein said releasable locking means comprises: a lengthy multi-links chain having attachment to a forward portion of the apparatus; and a catch attached to the restrainer-bar for removably catching a link of said chain.

9. The apparatus of claim 1 wherein the inclined-rail means comprises a pair of parallel lineal-rails respectively laterally offset from opposite upright sides of the cradle means and having a slope of a constant angular value selected within the range of substantially 10° to 20°; wherein the coupling means comprises collars respectively slidably engaged along the respective lineal-rails; and wherein the two collars are connected with said laterally extending restrainer-bar.

10. The apparatus of claim 9 wherein there are laterally extending pivot means for pivotably mounting the cradle member forward portion at substantially fixed-elevation whereby the supine animal might be humanely ejected from the canopied forward portion; and wherein there are hook means attached to the cradle member whereby it through said pivot means might be located at said fixed-elevation for convenient operation of the apparatus.

11. The apparatus of claim 10 wherein there are releasable locking means comprising: a lengthy multi-links chain having attachment to the cradle member forward portion; and a catch actuatably associated with the coupling means and for removably catching a link of the multi-links chain.

12. The apparatus of claim 4 especially adapted for castrating pigs having a range of sizes between ten and sixty pounds and wherein each of the lineal-rails has a constant slope selected within the angular range of 14° to 17°.

* * * * *